United States Patent [19]
Langan

[11] 3,876,836
[45] Apr. 8, 1975

[54] REMOTE CONTROL SYSTEM UTILIZING TELEPHONE RINGS AS ORDERS

[75] Inventor: Marion J. Langan, Huntsville, Ala.

[73] Assignee: Avco Corporation, Huntsville, Ala.

[22] Filed: Apr. 3, 1974

[21] Appl. No.: 457,470

[52] U.S. Cl. .......... 179/2 A; 179/84 R
[51] Int. Cl. .......... H04m 11/00
[58] Field of Search .......... 179/2 A, 84 R, 2 R

[56] References Cited

UNITED STATES PATENTS

| | | | |
|---|---|---|---|
| 3,360,777 | 12/1967 | Kolm | 340/16 A |
| 3,702,904 | 11/1972 | Bard | 179/2 A |
| 3,783,193 | 1/1974 | Lee | 179/2 A |

*Primary Examiner*—Kathleen H. Claffy
*Assistant Examiner*—C. T. Bartz
*Attorney, Agent, or Firm*—Charles M. Hogan

[57] ABSTRACT

Telephone ringing at a remote location is monitored. Counters register one or two rings, as desired. The first ring sets up a gate-inhibiting period and the second ring extends that period. A count of one is applied to means for energizing an outlet or turning on an appliance. A count of two is supplied to means for deenergizing the outlet or turning off the appliance. The counters are reset at the end of the gate-inhibiting period, as originally established or extended. Supplemental resetting means becomes effective so as to render the system nonresponsive to rings in excess of two.

5 Claims, 2 Drawing Figures

REMOTE CONTROL SYSTEM UTILIZING TELEPHONE RINGS AS ORDERS

BACKGROUND OF THE INVENTION

1. Field of the Invention

This invention relates to remote control apparatus and particularly to a novel system for utilzing a predetermined number of telephone rings to provide control effects at the site of the called location.

The present invention is based on certain novel directive concepts and a novel perception of certain customs that prevail in the usage of telephones. One of these assumptions is that telephone callers ring at least three times before concluding that the station called is unattended.

2. Description of the Prior Art

The prior art is illustrated by the following United States Pat. Nos.:

| | | |
|---|---|---|
| 3,077,577 | Malone et al. | February 12, 1963 |
| 3,080,547 | Cooper | March 5, 1963 |
| 3,552,520 | Naubereit | January 5, 1971 |
| 3,579,187 | Knott | May 18, 1971 |

The prior art shows a number of remote control systems in some of which a signal detector responds to a predetermined signal or code in order to produce a control effect of some kind. However, this invention provides for the first time a combination of means for registering a count of one or more telephone rings at the called location, means for utilizing each ring to set up a gate-inhibiting period and means for resetting the counting means after the end of the gate-inhibiting period, as orginally set or as extended. A further feature of the invention comprises supplemental means for accomplishing resetting after the completion of a predetermined number of rings. Other and further objects, advantages, capabilities and features of the invention will appear from the following description of the appended drawings.

SUMMARY OF THE INVENTION

In the system according to the invention a caller sends in an order to a called telephone by hanging up the addressing telephone after a prescribed number of rings, say one or two. This order is registered at the called location by suitable counting means. On reception of each ring or order at the called location an inhibiting period is set up. After the end of the inhibiting period the counting means is reset. A count of one is suitably registered and then gated to provide a desired control effect, for example, the turning on of an appliance or the provision of energy to an electrical outlet. On the other hand, and order of two rings, for example, is registered and then gated to provide a different control effect, for example the turning off of an appliance or the deenergizing of the outlet. As an extension of the invention telephone lifting devices are appropriately employed, in a manner described below, to permit the caller to verify the execution of the orders and the performance of the desired functions.

DESCRIPTION OF THE PREFERRED EMBODIMENT

Figure 1:
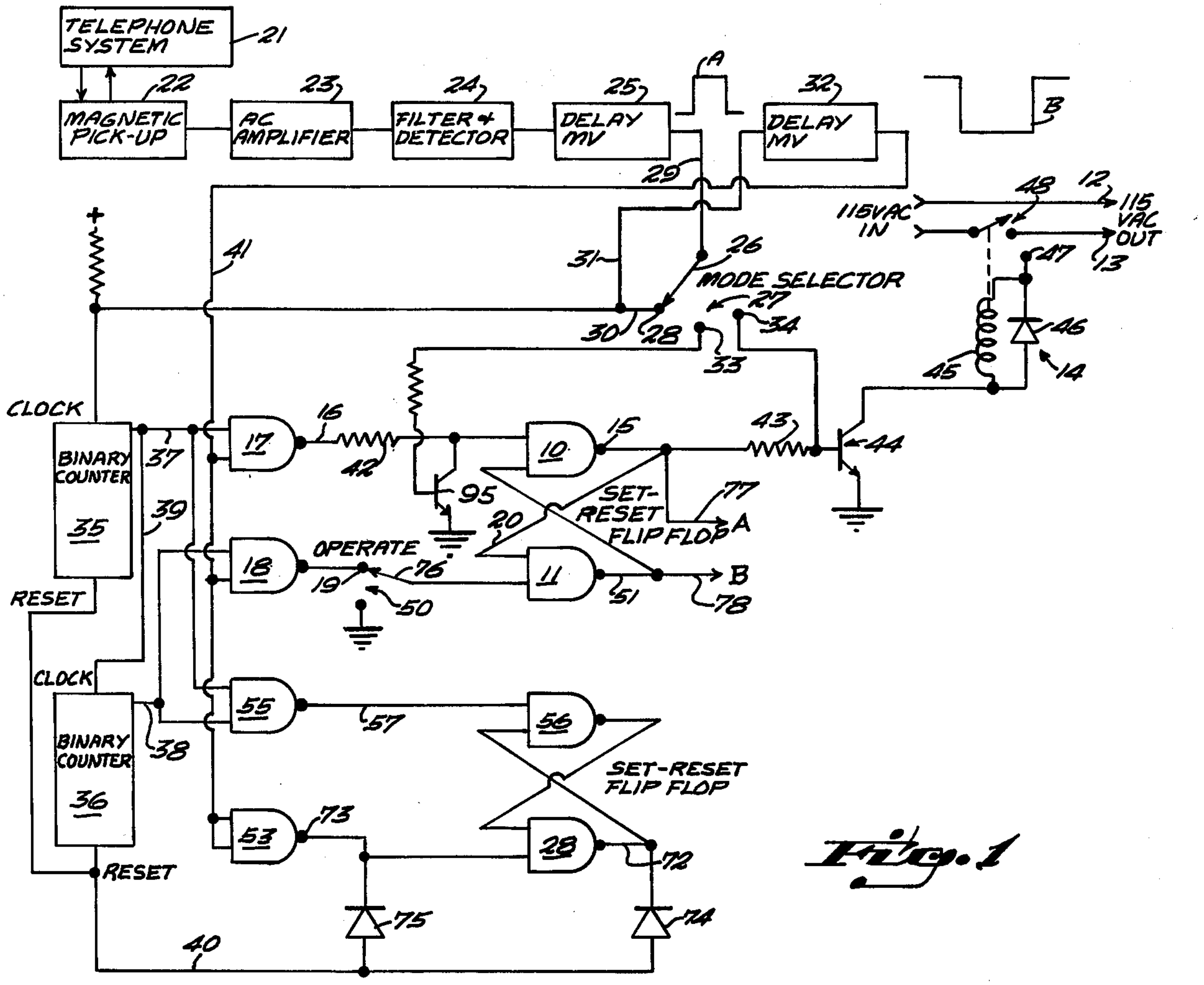
FIG. 1 is a schematic diagram, generally in block form, of a preferred embodiment of telephone ringing remote control system in accordance with the invention.

The preferred embodiment of the invention herein shown is based on the assumption that it is customary for telephone callers to ring at least three times before assuming that the station called is unattended.

The specific embodiment herein shown, which constitutes the preferred version or best mode, as at present understood, responds to one ring to perform a control function, for example, the application of power to an alternating current outlet. It responds to two rings to perform another function, for example to disconnect power from that outlet. In summary, the preferred system responds to a single digit to perform one control function and to two digits to perform another control function. The system does not respond to rings in excess of two. It will of course be understood that the specific control functions herein shown are illustrative both as to nature and sequence.

The first and second control functions are performed by a first flip-flop which comprises gates 10 and 11. The first control function is the energizing of alternating current (AC) outlet terminals 12, 13 by reason of the activation of relay 14. Each of the gates 10 and 11 has two input terminals and one output terminal and the connections are such that the two gates perform as a flip-flop. The first function is performed when the output 15 of gate 10 goes high, in response to a low output on the line 16 of gate 17, line 51 then going low to hold the output 15 of gate 10 high.

The second control function is the deenergizing of the outlet terminals 12, 13 by reason of the deactivation of relay 14. This occurs when the output of gate 11 goes high, in response to a low output on gate 18 at 19, the line 20 then going low to hold the output of gate 11 high.

Having described the two principal control functions and the flip-flop 10, 11 that causes them to be performed, I now refer to the means which senses the occurrence of a ring. There is provided a pickup device 22 which is magnetically or acoustically coupled to the ringing circuit of a telephone system 21. The preferred pickup device functions as a magnetic field detector and furnishes a signal in response to the development of the low frequency magnetic field that accompanies the ringing of the telephone. When acoustic pickups are used they must be designed to exclude extraneous sounds such as those from automobile horns or doorbells. It is within the scope of the invention to employ any suitable ring sensing device for the elements 22–24, such as a wide frequency response microphone in association with appropriate filtering for the selection of the telephone ring signal.

The magnetic pickup device shown at 22, FIG. 1, is coupled to a suitable amplifier 23, the output of which is in turn coupled to a filter and detector network 24. The output of the network 24 is applied to a delay multivibrator 25. This multivibrator produces a positive-polarity pulse, such as that bearing the legend A, in response to each ring.

The subcombination of elements 22, 23, 24 and 25 which produces the wave forms A, one in response to each ring, is collectively referred to as means responsive to a ring for producing a signal. The on-time interval of each A-pulse is selected to be slightly longer than the time of a normal telephone ring cycle.

Let it now be assumed, for purposes of discussion, that movable contact 26 of a mode selector switch 27 is touching fixed contact 28, so that the output of multivibrator 25 is connected by line 29, contacts 26 and 28, and lines 30 and 31 to the input of a delay multivibrator 32. The function of the delay multivibrator 32 will now be described. Multivibrator 32 inhibits decoding gates 17 and 18 and enables counters 35 and 36 via gate 53 and diode 75 until rings no longer occur. Its output wave form B is of negative polarity with the leading edge of B-pulse coinciding in time with the leading edge of the A-pulse. The first wave form A initiates a counting process. The delay multivibrator 32 constitutes means for providing a time in excess of that required for two successive telephone rings. Multivibrator 32 is retriggered by every ring and thus inhibits the decoding process until ringing is completed. Decoding occurs when the positive going trailing edge of multivibrator 32 enables gates 17 and 18. Following the decoding process (by a fraction of a microsecond) counter 35 and 36 are reset via gate 53 and diode 75 as the result of the inputs to gate 53 going high.

Each ring activates delay multivibrators 25 and 32. The delay multivibrator 32 produces, whenever activated, a low output as shown by negative-polarity wave form B. The duration of wave form B is greater than the time interval between the leading edges of any successive pulses A.

Parenthetically, the mode selector switch 27 comprises a movable contact 26 connected by line 29 to the output of delay multivibrator 25, together with fixed contacts 28, 33 and 34. Contact 28 is connected by lines 30 and 31 to the input of delay multivibrator 32 and by line 30 to the input of binary counter 35.

In the system there are provided binary counters 35 and 36. In response to one ring the wave form A causes a count of one to be registered on output line 37 of counter 35. In response to two successive wave forms A the binary counter 36 registers a count of two on its output line 38. Line 39 couples the output of binary counter 35 to the input of binary counter 36. A reset line 40 is coupled to both binary counters for purposes later described herein.

Let there now be considered the events which occur in response to one ring. The output of delay multivibrator 25 goes high, per wave form A, and the output of delay multivibrator 32 goes low, per wave form B. The trailing edge of wave form A causes binary counter 35 to register a one and to assume that state at which its output 37 is high. If there is only one ring before wave form B terminates, that is, if the output of delay multivibrator 25 remains low, following wave form A, for a time interval somewhat greater than that which occurs for repetitive rings, then delay multivibrator 32 times out and wave form B terminates and line 41 returns to the high state. If this occurs after one ring, then lines 37 and 41 are both high and the output of gate 17 goes low. That is, NAND gate 17 causes line 16 to go low on the condition that a one is registered on line 37 during the period set up by wave form B.

Gate 17 constitutes a means for indicating that there has been one ring during a predetermined period in that this gate has two inputs of which one, 37, is activated in response to a ring, specifically to wave form A, and in which the other, 41, is activated at the termination of the predetermined period. The gate 17 produces a low output as a result of one ring occuring during the first negative-going wave form B. The duration of the wave form B is accordingly set to be greater than the time interval between the leading edges of successive A pulses.

The output of gate 17 is coupled by resistor 42 to one of the inputs of gate 10 and the output of gate 10 is coupled by resistor 43 to the base of transistor 44, which is connected in the grounded emitter configuration. The collector of that transistor is in series with coil 45 of the relay 14, which coil is shunted by a diode 46 and is in series with a terminal 47, in turn connected to a suitable source of bias currents (not shown). Transistor 44 is an NPN transistor so arranged that when the output 15 of gate 10 goes high the collector circuit of the transistor becomes conductive, activating relay 14, closing contacts 48 and causing the AC outlet 12, 13 to be connected directly to the supply lines and accordingly to be energized.

Consider now the events which occur in response to two rings. The second wave form A causes a count of two to be registered on the output line of the binary counter 36. That is, line 38 goes high and line 37 returns to the low state. The two successive rings produce successive wave forms A which successively trip delay multivibrator 32. The second wave form B starts before the first wave form B ends. When the second wave form B is terminated line 38 and input 41 to gate 18 are both high so that the output 19 of that gate goes low. This output is coupled, via switch 50, to an input of gate 11 of the flip-flop. The output of gate 11 goes high. The flip-flop 10, 11 is so arranged that when output 51 of gate 11 goes high, at a time when the output of gate 17 is high, then the output 15 of gate 10 goes low so that transistor 44 becomes nonconductive and relay 14 is deactivated and outlet terminals 12, 13 are deenergized. This is the second control effect mentioned above.

The quiescent operating condition of the system is one in which the output line 41 of delay multivibrator 32 is high, the output of gate 53 at 73 is low, and the binary counters 35 and 36 are maintained in the reset condition with the output lines 37 and 38 in the low state so that the outputs of gates 17, 18 and 55 are high.

While the binary counters are counting the rings there is no response from gates 17, 18 and 53 because they are inhibited by the wave form B output of delay multivibrator 32. When a count of three is completed. then there comes into operation circuitry which causes all rings in excess of two, occuring during the negative wave form B, to be negated. Reference is made specifically to a flip-flop circuit comprising gates 56 and 28, coupled, respectively, to gates 55 and 53. Gate 55 has two inputs connected to lines 37 and 38 so that, upon completion of the count of three rings, which cause lines 37 and 38 to both be high, gate 55 produces a low condition on its output line 57, thereby setting flip-flop 56, 28 in such manner that a low potential condition is produced on the output line 72 of this flip-flop. This line is connected, via diode 74, to reset line 40 in such a manner that a low condition on line 57 resets the binary counters 35 and 36 and holds them in the reset condition even through additional clock pulses be received from delay multivibrator 25 via line 30. Therefore, during the period of the wave form or forms B, but not because of them, rings in excess of two are ignored. The objective of the elements 55, 56, 28 and 74, cooperatively, is to produce and maintain the reset condition of the binary counters 35 and 36 after the count of three has been achieved and while the wave form or forms B are continuing.

At each termination of the wave form or forms B, an order to reset the counters and flip-flop 28, 56 is furnished by gate 53, both inputs of which are connected to line 41, which goes high at the termination of wave form B, making line 73 low and resetting the flip-flop 28, 56. Line 73 is coupled to reset line 40 via a diode 75.

The principal aspect of the resetting circuitry comprising mainly the gates 55, 56, 53 and 28 is that resetting of the binary counters is ordered by gate 53 whenever wave form or forms B terminate, whereupon the flip-flop 56, 28 is also reset. On the other hand, resetting of the binary counters is ordered by gate 55 and flip-flop 56, 28 during those portions of the periods of wave form or forms B which follow three rings. In other words, the resetting circuitry comprises a principal count-inhibitor that operates at the termination of wave form B and a supplemental inhibitor that operates during that portion of wave forms B succeeding the completion of three rings. Counting by the counters is the action inhibited.

When contacts 26 and 28 are made the position is referred to as the "decode" position. When contact 26 touches contact 33 the condition is referred to as "normal." When the mode selected involves establishing contact between contacts 26 and 34 the variety of operation is referred to as "strobe."

It will be understood that the mode selector 27 is not essential to the invention but it is a highly desirable option. In the above description the operation for the decode mode has been described. If the switch is placed in the normal position a ring of the telephone activates delay multivibrator 25 to produce a wave form A, causing the collector circuit in transistor 95 to conduct so that the output of gate 10 goes high and the output of gate 11 goes low, coil 45 is energized and the outlet circuit 13, 14 is connected to power. This condition is maintained until the reset switch 50 is operated to place its contact 78 in circuit with ground, which causes the output of gate 11 to go high and gate 10 to go low to deenergize the relay 14 and disconnect outlet 12, 13 from the power source. The purpose of the reset switch 50 is simply to deenergize relay 14 when desired. Normally blade 78 of that switch is closed on contact 19.

The normal position of switch 27 has this effect: any ring of the telephone will produce an output from multivibrator 25 and cause transistor 95 to conduct, thereby providing a sustained high output from gate 10 and causing coil 45 to be energized. The normal position would be employed, for example, if a person desired to use the terminals 12 and 13 to interconnect a light and a power source whenever the telephone rings, in order to illuminate the phone, for example, or in order to furnish an indication to some device that would let the householder know that there was a call during his absence.

In the strobe position the output of delay multivibrator 25 is directly connected to the base of transistor 44 so that any ring of the telephone or output on multivibrator 25 causes relay 14 to be energized and terminals 12 and 13 activated for a short period to cause a lamp to flash in synchronism when the telephone rings, for example, or in some manner to alert the householder to the fact that his phone is ringing.

Figure 2:
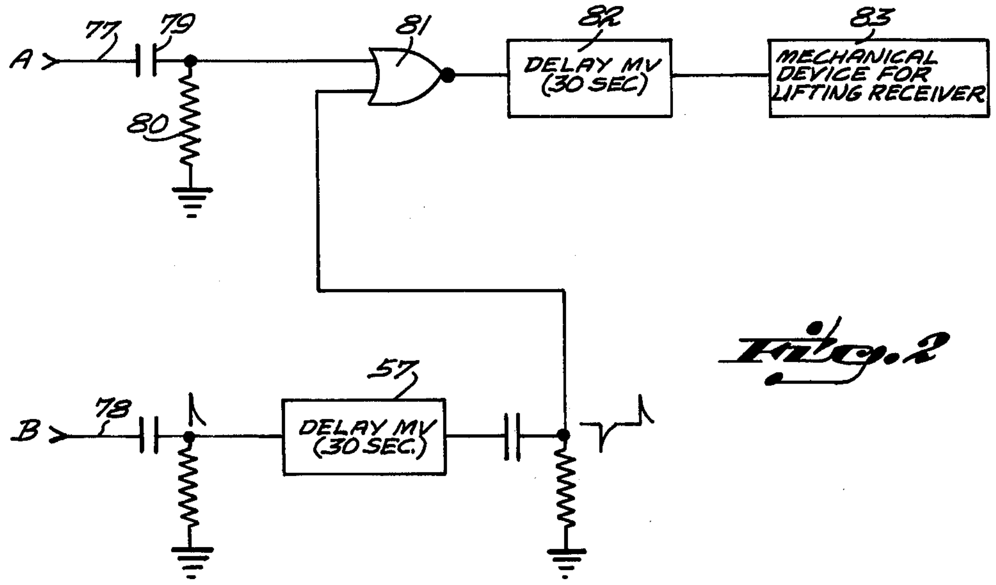
FIG. 2 is a block diagram of monitoring or checking accessories suitable for use with the FIG. 1 embodiment.

Before referring to FIG. 2, reference is made to output 77 of gate 10 and output 78 of gate 11. Output 77 is shown in FIG. 2 as coupled, via series capacitor 79 and shunt resistor 80 to an input of NOR gate 81, the output of which is coupled to a delay multivibrator 82, in cascade with mechanical device 83. Whenever the output 77 of flip-flop 10, 11 goes high, a wave form is produced by multivibrator 82 to activate a conventional answering service mechanism 83 which causes the receiver to be lifted for a specified period (for example, thirty seconds). Any new call within this time interval will set up a busy signal.

When the output 78 from gate 11 changes from a low state to a high state a delay multivibrator 57 is activated for 30 seconds, say. The trailing edge of its wave form is applied to gate 81 in such manner that mechanical device 83 raises the receiver for a period of 30 seconds following the initial 30 second delay. After initially allowing the phone to ring twice, a caller could then wait for 45 seconds, replace the call, and receive a busy signal, indicating that relay 14 has been deenergized.

From the foregoing it will be seen that the invention provides in a telephone system of the type which comprises a calling telephone and a called telephone 21, a combination for performing functions at the called telephone location in response to rings ordered at the calling telephone, comprising: means 22, 23, 24, 25 responsive to each ring for producing a signal, a first counter 35 for registering at the called location a single count corresponding to one signal, a second counter 36 for registering at the called location two counts corresponding to two signals, a first gate 17 adapted to be enabled to pass a single count for the performance of a control effect by binary device 10, 11, a second gate 18 adapted to be enabled to pass the count of two for the performance of a different control effect by said binary device, means 32 responsive to each signal for inhibiting the first and second gates for predetermined periods, means 53, 75 responsive to the cessation of inhibiting for resetting the counters, and an additional means 55, 56, 28, 74 responsive to the completion of a count of three for resetting of the counters.

While there has been shown and described what are at present considered to be the preferred embodiments of the invention, various modifications and changes may be made therein without departing from the proper scope as defined by the appended claims.

I claim:

1. In a telephone system of the type which comprises a calling telephone and a called telephone, a combination for performing functions at the called telephone location in response to rings monitored at the calling telephone, comprising:

means responsive to each ring for producing a signal, a first counter for registering and storing at the called location a single count corresponding to one signal, a second counter for registering and storing at the called location two counts corresponding to two signals, a first gate coupled to the first counter and adapted to be enabled to pass a single count out of the first counter for the performance of a control effect, a second gate coupled to the second counter and adapted to be enabled to pass the count of two out of the second counter for the performance of a different control effect, delay circuit means responsive to each signal for inhibiting the first and second gates for predetermined periods so that each count is passed after a delay following its registry, means including a third gate and responsive to the cessation of inhibiting for resetting the counters, supplemental means responsive to the completion of a count of three for resetting the counters and holding them in reset condition, and means including a first binary device having an output for coupling or uncoupling an outlet to a source of energy, said first and second gates being coupled to said binary device and individually operative to change its state so that one of said control effects is the coupling and the other of said control effects is the uncoupling, said supplemental means comprising a fourth gate coupled to both of said counters, and a second binary device adapted to set from the fourth gate and to be reset by the means responsive to the cessation of inhibiting.

2. In a telephone system of the type which comprises a calling telephone and a called telephone, a combination for performing functions at the called telephone location in response to a ring monitored at the calling telephone, comprising:

means responsive to a ring for producing a signal, means for registering and storing at the called location a count corresponding to said signal, a gate coupled to said counter and adapted to be enabled to pass the stored count for the performance of a control effect, delay circuit means responsive to said signal for inhibiting said gate for a predetermined period, and means responsive to the cessation of inhibiting for resetting the registering and storing means.

3. In a telephone system of the type which comprises a calling telephone and a called telephone, a combination for performing functions at the called telephone location in response to rings monitored at the calling telephone, comprising:

a first multivibrator responsive to each ring for producing a signal, a first counter for registering and storing at the called location a single count corresponding to one signal, a second counter for registering and storing at the called location two counts corresponding to two signals, a first NAND gate adapted to be enabled to pass a single count from the first counter for the performance of a control effect, a second NAND gate adapted to be enabled to pass the count of two from the second counter for the performance of a different control effect, a second multivibrator responsive to each signal for inhibiting the first and second gates for predetermined periods, means responsive to the cessation of inhibiting for resetting the counters, and means including a third NAND gate and a binary device and responsive to the completion of a count of three for resetting the counters.

4. In a telephone system of the type which comprises a calling telephone and a called telephone, a combination for performing functions at the called telephone location in response to rings monitored at the calling telephone, comprising:

means responsive to each ring for producing a signal, a first counter for registering and storing at the called location a single count corresponding to one signal, a second counter for registering and storing at the called location two counts corresponding to two signals, a first binary device having two states for performing distinct control effects, a first gate adapted to be enabled to pass a single count to put said first binary device in one state, a second gate adapted to be enabled to pass the count of two to put said binary device in its other state, delay circuit means responsive to each signal for inhibiting the first and second gates for predetermined periods, means including a third gate and responsive to the cessation of inhibiting for resetting the counters, and supplemental means, including a fourth gate and a second binary device, and responsive to the completion of a count of three for assuring resetting of the counters.

5. The combination in accordance with claim 4, and an electrical outlet, the control effects being the energizing and deenergizing of said outlet, said called station having an earphone, and means responsive to a control effect for lifting the receiver for a predetermined interval following said effect so that a call subsequent to the first call results in a busy signal.

* * * * *